Patented Feb. 26, 1935

1,992,832

UNITED STATES PATENT OFFICE 1,992,832

MANUFACTURE OF CARBON BISULPHIDE

Frank J. Mootz, Indianapolis, Ind., assignor to Peter C. Reilly, Indianapolis, Ind.

No Drawing. Application July 14, 1932, Serial No. 622,480

10 Claims. (Cl. 23—206)

It is the fundamental object of my invention to improve the manufacture of carbon bisulphide, and to make commercially available for that manufacture certain sources of carbon hitherto considered unsuitable therefor because when taken alone they are substantially unreactive with sulphur vapors.

In making carbon bisulphide heretofore, it has been considered essential to use charcoal as the source of carbon. In such manufacture, sulphur vapors have been passed at reaction temperature in contact with charcoal, (generally through a mass of broken-up charcoal), to produce carbon bisulphide by direct combination of carbon and sulphur, as indicated by the following equation:

(1)  $C + S_2 \rightarrow CS_2$

Other forms of carbon than charcoal have been tried, but have hitherto proved unsatisfactory. Such other forms of carbon include carbon derived from coal, coal-coke, petroleum coke, and coke made from coal-tar or coal-tar pitch. No commercial yield of carbon bisulphide has hitherto been obtainable from these forms of carbon when they were substituted for charcoal in the process above outlined, because taken alone they are substantially unreactive with sulphur vapors.

By my invention, various forms of carbon hitherto considered unavailable are made available and effective for use in producing a high yield of carbon bisulphide.

I have discovered that two factors enter into the production of carbon bisulphide, besides the presence of carbon and of sulphur at elevated temperature. These two factors, in the order of their importance, are:

1. The presence of a catalyst—desirably a compound of an alkali metal or an alkaline-earth metal.

2. The extent of exposed carbon surface, as provided by high porosity.

The second feature, high porosity, has been recognized before as desirable, and was considered so essential that lack of it has sometimes been given as the reason why other carbons than charcoal have not proven suitable for making carbon bisulphide. But I have found that while the second feature is desirable, the first feature (the presence of a catalyst) is more important, and that carbon bisulphide may be made effectively from carbons which are not highly porous if a catalyst is present; although I prefer to have both features present for best results.

These features may be what has made charcoal effective; but certainly the first of them (the presence of a catalyst) has not been recognized heretofore as playing any part.

By providing either the first of these features or both of them in carbon-sources hitherto considered unavailable for making carbon bisulphide, I have discovered that those carbon sources are made available and effective for that purpose; and that at the same time a very pure form of carbon bisulphide is obtained as the initial product, instead of the highly impure form obtained when charcoal is used. I have also discovered that by adding a suitable catalyst even to charcoal I can increase the yield of carbon bisulphide obtained from it.

The catalyst may be any substance which promotes the union of sulphur and carbon. There are a number of such catalysts which I have found effective. They include compounds of the alkali metals and of the alkaline-earth metals; but especially compounds of sodium, potassium, lithium, calcium, barium, strontium and magnesium. The most effective compounds of these metals I have found to be the hydroxides, and of these the best are sodium and potassium hydroxides; but other compounds may be used, such as carbonates, oxides, nitrates, sulphides, cresylates, stearates, oxalates, etc. I have also found that good catalytic action is obtained if a mixture of compounds of a plurality of the metals named are present, such for instance as a mixture of sodium and potassium hydroxides. The amount of the catalyst in the final carbon may vary within wide limits, from a trace upward; but I prefer that it be not more than about 15%, and I find that 1% or 2%, or even less, is sufficient.

I am not certain how the catalyst plays its part in the union of sulphur and carbon. It may be that the catalyst, when in the presence of sulphur vapors at high temperature, is converted into a sulphide, possibly a polysulphide, and that such sulphide is the real catalyst. For instance, possibly the sodium or potassium hydroxide, or the sodium or potassium carbonate, reacts with the sulphur vapors to form a polysulphide of sodium or potassium, such for instance as the trisulphide or the pentasulphide; and that this sulphide, possibly by some reversible reaction which alternately raises and lowers the number of sulphur atoms in the sulphide, is the active catalyst in the reaction forming carbon bisulphide. I am inclined to think that some polysulphides—such as trisulphides, tetrasulphides, and pentasulphides—are certainly formed in the reaction, and that the hydroxide or carbonate is largely converted thereinto. However this may be, and whatever may be the actual catalyst at the high temperature at which the reaction to form carbon bisulphide takes place, the catalyst as it is present at low temperatures may take a great number of forms, as has been indicated above.

The carbons to which the catalyst is added may be those obtained by carbonizing coal, asphaltum, lignite, peat, or gilsonite; or may even be charcoal itself; or may be cokes formed from coking materials, such as coking coal, petroleum, coal-tar, coal-tar pitch, or vegetable tars and pitches. The catalyst may be added before or after the carbonization or the coking is done.

Thus I may treat coal-tar carbon, petroleum coke, coal-coke, carbons derived from coal, asphaltum, lignite, peat, or gilsonite, or even charcoal itself, to put an alkali-metal or an alkaline-earth-metal compound on and into its surface as a catalyst; and may then use the coated carbon in place of ordinary charcoal in producing carbon bisulphide as above described, with satisfactory yields of carbon bisulphide, and with an increase in the yield if the carbon was charcoal; whereas, except in the case of charcoal, if the same carbon source is used without the catalyst no substantial yield of carbon bisulphide is obtained.

As examples of this, I may soak coal-coke, the carbon obtained by carbonizing a non-coking coal, the coal-tar carbon or coke which is the residue from the distillation of coal-tar to a carbon-coke residue, petroleum coke, or charcoal, either in a solution of sodium hydroxide or potassium hydroxide or in molten sodium hydroxide or potassium hydroxide, to produce thereon a hydroxide coating which covers the exposed surface of the carbon and penetrates into the carbon more or less superficially. Such a treated carbon may be used very effectively in place of charcoal in making carbon bisulphide by passing sulphur vapors in contact with the heated carbon.

Instead of merely coating a carbon with the catalyst, however, I may and preferably do add the catalyst to the carbon-producing material before the carbonization or coking is done; to produce a resultant carbon, whether coked or not, in which the catalyst is uniformly distributed or impregnated.

Thus, for instance, I may mix finely divided coal, such as a coking coal, or as a non-coking coal like anthracite, with the catalyst which promotes the union of sulphur and carbon, carbonize the mixture whether or not coke is produced, and use the resulting carbon with its associated catalyst as the carbon-source for reaction with the sulphur vapors to form carbon bisulphide.

As another example, I may take any suitable coking material, mix with it either a solution of an alkali-metal or alkaline-earth-metal hydroxide or molten alkali-metal hydroxide, the coking material of course being at a sufficiently elevated temperature during the mixing if molten alkali hydroxide is used, and then coke the mixture to produce the desired alkalinized coke. For the coking material, I may use ordinary coking coal, or petroleum, or asphaltum, or vegetable tars or pitches, or coal tar or coal-tar pitch. A coking material which I prefer is coal tar or coal-tar pitch; not only because it has a low ash and because the carbon bisulphide obtainable by using it is very pure, but because it yields a highly porous coke when it is coked with an alkali-metal hydroxide, as described below. The coking material is desirably heated to a temperature of about 300° to 350° C., and mixed at that temperature with molten sodium hydroxide or potassium hydroxide. Then this mixture is coked, to drive off moisture, hydrogen, substantially all of the hydrocarbons, and other volatile matter.

The presence of the alkali-metal hydroxide during this coking operation serves effectively with some cokes, notably coal-tar coke, to increase the porosity of the coke residue, as compared to that of coke obtained without it; and in coal-tar coke gives a fine porosity in the coke that is of an order approaching that in charcoal. This increased porosity, probably by increasing the surface, increases still further the effectiveness of the coke in the making of carbon bisulphide; but I consider it a secondary feature, for various other cokes which are impregnated with alkali-metal hydroxides may be effectively used even if their porosity has not been increased over normal.

In making the impregnated coal-tar coke, it is desirable to use one of the alkali-metal hydroxides (sodium, potassium, or lithium), because those hydroxides increase the porosity of that coke; but alkaline-earth hydroxides, as well as other compounds of alkali-metals and of alkaline-earth metals, may be effectively used as catalysts even though they may not increase the porosity.

I prefer to conduct the coking process until a temperature of at least 700° to 900° C. is reached in coking coal, and until at least 500° to 600° C. is reached in coking liquid coking materials; in both cases until distillation has substantially stopped. This gives a full coke, that is quite hard and strong; in addition to being very porous because of the presence of the alkali-metal hydroxide during the distillation if the coke is coal-tar coke.

The proportion of catalyst to coking material may vary widely. For instance, in coking coal, 10 to 50 parts of coal, or even more, to 1 part of potassium hydroxide gives good results. In using coal tar or coal-tar pitch, I have found that about 20 to 25 parts of tar (yielding about 40% coke residue) or 12 to 15 parts of pitch (yielding about 70% coke residue) to one part of sodium hydroxide or about ¾ parts of potassium hydroxide gives good results, not only in producing a highly porous impregnated coke, but in producing carbon bisulphide from such coke. By increasing the amount of alkali-metal hydroxide present, say up to enough to give 20% in the coal-tar coke, the porosity is increased; but the cost is more than correspondingly increased, due to the cost of alkali-metal hydroxide, and I prefer to use no more alkali-metal hydroxide than enough to give from 3% to 12% of it in the coke, and may use less. But my invention is not dependent on any specific proportions.

While I consider 3% to 12% alkali-metal hydroxide in the coke is desirable, for obtaining porosity in coal-tar coke, and possibly for other reasons, it is more than is usually necessary for the catalytic action in making carbon bisulphide. Therefore, after the coke has been made, I prefer to remove a large part of the alkali-metal hydroxide by washing it out of the coke, as with water, desirably but not necessarily hot water. By such washing or extraction I can recover a large part of the alkali-metal hydroxide used, and in fact nearly all of it, and indeed thereby obtain an improved action in the later production of carbon bisulphide; while still leaving in the coke a sufficient amount, say 1% or 2% or less, as shown by the increased ash obtainable as well as the increased activity, to act as a catalyst to promote the formation of carbon bisulphide when the coke is heated and sulphur vapors are passed in contact with it.

In using a full coke containing an alkali-metal or alkaline-earth-metal compound as a catalyst, especially that produced from coal tar or from petroleum, as the carbon in making carbon bisulphide, the carbon bisulphide initially obtained is substantially pure. It is substantially water white, and has the sweetish ethereal odor characteristic of pure carbon bisulphide. This is in sharp distinction to the present commercial crude carbon bisulphide obtained by using ordinary charcoal as the carbon; for that commercial crude carbon bisulphide is brownish or yellowish in color, and has a disagreeable odor due to the presence of contaminants resulting from the reaction of the sulphur vapors with impurities in the charcoal. Such contaminants not only make the carbon bisulphide impure, and make necessary further purification processes that are at least largely if not wholly unnecessary with my process of producing it, but also increase the cost of production both by the necessity for such purification processes and by the necessity for additional sulphur over that which combines with the carbon to produce the carbon bisulphide. I avoid these difficulties.

Further, when charcoal is used in producing carbon bisulphide, it is necessary to drive off a considerable amount of moisture; for charcoal tends to take up moisture of the air to the extent of about 5%. My cokes, after having been washed, and dried at ordinary temperatures, are comparatively free from moisture, and do not take up appreciable moisture from the air; so that the necessity for driving off a large quantity of moisture before admitting sulphur vapors into the carbon-bisulphide-producing furnace is avoided. In this respect my cokes thus have an advantage even over the treated charcoal which is included in my broad invention.

Another disadvantage in using charcoal is its high shrinkage in volume. In heating up to 1000° C., which is a desirable temperature for producing carbon bisulphide, charcoal decreases in volume about one-third; whereas my cokes rarely shrink more than 12% to 15%, and usually not more than 5% to 8%. In this respect also my cokes have an advantage over charcoal, whether ordinary charcoal or my treated charcoal.

I claim as my invention:

1. The process of making carbon bisulphide, which consists in causing contact at reaction temperature of sulphur vapors with carbon to which a hydroxide of a metal of the class consisting of sodium, potassium, lithium, calcium, barium, strontium, and magnesium has been added.

2. The process of making carbon bisulphide, which consists in coating carbon with a catalyst which promotes the union of sulphur and carbon, and causing contact at reaction temperature between sulphur vapors and such coated carbon.

3. The process of making carbon bisulphide, which consists in impregnating a carbon with a catalyst which promotes the union of sulphur and carbon, and causing contact at reaction temperature between sulphur vapors and such impregnated carbon.

4. The process of making carbon bisulphide, which consists in mixing coking material with an alkali-metal hydroxide, coking such mixture, and passing sulphur vapors in contact with such coke at an elevated temperature.

5. The process of making carbon bisulphide, which consists in mixing coking material with an alkali-metal hydroxide, coking such mixture, washing to remove excess alkali-metal compound, and passing sulphur vapors in contact with such coke at an elevated temperature.

6. The process of making carbon bisulphide, which consists in mixing coking material with a catalyst which promotes the union of sulphur and carbon, coking such mixture, and passing sulphur vapors in contact with such coke at an elevated temperature.

7. The process of making carbon bisulphide, which consists in mixing a coking material in liquid condition with a catalyst which promotes the union of sulphur and carbon, coking the mixture and passing sulphur vapors in contact with the resultant coke at an elevated temperature.

8. The process of making carbon bisulphide, which consists in mixing a material of the class consisting of coal tar and coal-tar pitch with an alakli-metal hydroxide, coking the mixture, and passing sulphur vapors in contact with the resultant coke at an elevated temperature.

9. The process of making carbon bisulphide, which consists in mixing coal with a catalyst which promotes the union of sulphur and carbon, carbonizing the mixture, and passing sulphur vapors in contact with the resultant product at an elevated temperature.

10. The process of making carbon bisulphide, which consists in causing contact at reaction temperature of sulphur vapors with carbon to which a mixture of compounds of a plurality of metals of the class consisting of the alkali metals and the alkaline-earth metals has been added.

FRANK J. MOOTZ.